(12) United States Patent
Hack et al.

(10) Patent No.: US 11,803,634 B2
(45) Date of Patent: Oct. 31, 2023

(54) SECURE PRECONFIGURED PROFILE FOR ROLE-BASED ACCESS CONTROL SETUP

(71) Applicant: International Business Machines Corporation, Armonk, NY (US)

(72) Inventors: Mark Elliott Hack, Austin, TX (US); Warren William Grunbok, Poughkeepsie, NY (US); Rosana Ramos Morales, Tlaquepaque (MX)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 17/184,946

(22) Filed: Feb. 25, 2021

(65) Prior Publication Data

US 2022/0269772 A1  Aug. 25, 2022

(51) Int. Cl.
| | | |
|---|---|---|
| G06F 21/46 | (2013.01) | |
| G06F 9/4401 | (2018.01) | |
| G06Q 30/04 | (2012.01) | |
| G06F 8/60 | (2018.01) | |

(52) U.S. Cl.
CPC ............ *G06F 21/46* (2013.01); *G06F 9/4401* (2013.01); *G06Q 30/04* (2013.01); *G06F 8/60* (2013.01)

(58) Field of Classification Search
None
See application file for complete search history.

(56) References Cited

U.S. PATENT DOCUMENTS

| | | | | |
|---|---|---|---|---|
| 5,968,116 A | * | 10/1999 | Day, II | ................... H04L 67/06 |
| | | | | 709/202 |
| 8,725,645 B1 | * | 5/2014 | Montini | ................ G06F 21/125 |
| | | | | 705/52 |
| 9,195,806 B1 | * | 11/2015 | Robinson | ............ G06F 12/1408 |
| 9,424,017 B2 | * | 8/2016 | Macken | .................... G06F 8/61 |

(Continued)

FOREIGN PATENT DOCUMENTS

| | | |
|---|---|---|
| CN | 101321306 B | 7/2011 |
| CN | 103841107 A | 6/2014 |

(Continued)

OTHER PUBLICATIONS

Amphenol Advanced Sensors: "Kaye Validator User's Manual"—the first 3 paragraphs of Section 3.1 (p. 49), Jul. 1, 2014, XP055511294, Retrieved from the Internet, 1 Pg, <https://www.transcat.com/media/pdf/Kay e-Validator-AVS-Use_manual.pdf>.

(Continued)

*Primary Examiner* — James R Turchen
(74) *Attorney, Agent, or Firm* — Stosch Sabo (57) ABSTRACT

Described are techniques for a secure roles-based access control (RBAC) setup during boot of a connected computational system. The techniques include a method comprising deploying a preconfigured default user profile during booting of a computational system. The techniques further include creating, using the preconfigured default user profile, a plurality of user profiles having administrator and/or root authorities, where each of the plurality of user profiles (Continued)

is associated with a respective custom password. The techniques further include completing booting of the computational system using the plurality of user profiles having the administrator and/or root authorities.

18 Claims, 5 Drawing Sheets

(56) References Cited

U.S. PATENT DOCUMENTS

| | | | | |
|---|---|---|---|---|
| 2004/0006486 | A1* | 1/2004 | Schmidt | G06Q 30/06 |
| | | | | 726/6 |
| 2006/0041761 | A1* | 2/2006 | Neumann | H04L 63/083 |
| | | | | 713/189 |
| 2010/0306399 | A1* | 12/2010 | Khosravi | H04L 67/34 |
| | | | | 709/228 |
| 2015/0277986 | A1* | 10/2015 | Zhang | G06F 9/441 |
| | | | | 713/2 |
| 2016/0321450 | A1* | 11/2016 | Liu | G06F 21/45 |
| 2016/0365729 | A1* | 12/2016 | Pochana | G05B 13/021 |
| 2017/0366529 | A1* | 12/2017 | McNeely | H04W 12/33 |
| 2019/0052615 | A1* | 2/2019 | Auvenshine | H04L 63/083 |
| 2021/0034377 | A1* | 2/2021 | Martin | G06F 9/44505 |
| 2021/0382983 | A1* | 12/2021 | Ogasawara | G06F 21/71 |
| 2022/0197991 | A1* | 6/2022 | Lee | G06F 21/46 |

FOREIGN PATENT DOCUMENTS

| | | |
|---|---|---|
| CN | 104092691 A | 10/2014 |
| CN | 104252588 B | 5/2017 |
| CN | 103514412 B | 6/2017 |
| CN | 106650372 B | 5/2019 |
| CN | 106503570 B | 1/2020 |
| WO | 200011583 A2 | 3/2000 |

OTHER PUBLICATIONS

Patent Cooperation Treaty PCT Notification of Transmittal of the International Search Report and the Written Opinion of the International Searching Authority, or the Declaration, International Application No. PCT/EP2022/052572, International filing date Mar. 2, 2022, dated May 10, 2022, 12 Pgs.

Mell et al., "The NIST Definition of Cloud Computing", Recommendations of the National Institute of Standards and Technology, Sep. 2011, 7 pages.

* cited by examiner

SECURE PRECONFIGURED PROFILE FOR ROLE-BASED ACCESS CONTROL SETUP

BACKGROUND

The present disclosure relates to role-based access controls (RBAC), and, more specifically, to reducing exploitation of default profiles and default passwords in RBAC systems.

RBAC (also referred to as role-based security) is a policy-neutral access-control mechanism based on roles and privileges. RBAC relies upon many-to-many relationships between tasks, authorizations, roles, and users to restrict access based on a user's role within an organization. In other words, tasks are associated with required authorizations, one or more authorizations can be used to define a role, and one or more users can be assigned to one or more roles. RBAC is especially useful for organizations having hundreds or thousands of employees with thousands or millions of unique permission sets. Due to its scalability, RBAC has become a leading strategy for advanced access controls.

Traditionally, there is a single user profile (e.g., root) that manages access controls of a system. The root user defines user privileges, process privileges, and the like. To streamline system instantiation, a default root user profile with a default password is often shipped from a vendor to a customer. The default root user profile and default password are a known attack vector for compromising system security. For example, in some instances, the default password is included in publicly accessible user manuals or otherwise publicly retrievable (e.g., from internet chat boards, etc.). The public disclosure of a default password can enable a malicious user to gain root access to a system. Gaining root access to a system can enable a malicious user to gain system-wide access to the corresponding system and perform malicious actions such as accessing confidential data, modifying, destroying, or corrupting data, injecting spyware, malware, or viruses, and the like. Accordingly, there is a need to reduce the attack vector of default root user profiles and default passwords in computational systems.

A variety of inadequate solutions have been proposed to address the aforementioned attack vector of default user profiles and default passwords. Most commonly, vendors admonish customers to change the default password. However, not all customers follow these instructions. A second workaround is to segregate a default root user profile into numerous sub-profiles each associated with a default password such as administrator, password administrator, privileged administrator, password user, and password auditor sub-profiles. However, this solution simply reduces the attack surface of an exploited default sub-profile rather than preventing exploitation. A third workaround is to create an automatic expiration for any default password. However, similarly to the second workaround, this solution only limits the attack surface rather than preventing exploitation of default passwords. For example, a default password configured to expire after ninety days remains vulnerable to attack for the entirety of the ninety days.

For the aforementioned reasons, a mechanism for improving the out-of-the-box security posture of RBAC-based computational systems is required.

SUMMARY

Aspects of the present disclosure are directed toward a computer-implemented method comprising deploying a preconfigured default user profile during booting of a computational system. The method further comprises creating, using the preconfigured default user profile, a plurality of user profiles having administrator and/or root authorities, where each of the plurality of user profiles is associated with a respective custom password. The method further comprises completing booting of the computational system using the plurality of user profiles having the administrator and/or root authorities. Further aspects of the present disclosure are directed toward systems and computer program products storing program instructions configured to perform the aforementioned method.

Advantageously, the aforementioned aspects of the present disclosure prevent exploitation of default user profiles and default passwords that can be hardcoded into computational systems.

Further aspects of the present disclosure are directed toward automatically deleting the preconfigured default user profile after a threshold period of time. Advantageously, automatically deleting the preconfigured default user profile prevents it from being maliciously compromised to create additional, unauthorized used profiles.

Further aspects of the present disclosure are directed toward automatically deleting the preconfigured default user profile after creating the plurality of user profiles having the administrator and/or root authorities. Advantageously, automatically deleting the preconfigured default user profile prevents it from being maliciously compromised to create additional, unauthorized used profiles. Furthermore, basing the deletion upon the creation of the plurality of user profiles can ensure that a sufficient number and/or type of user profiles are created by the preconfigured default user profile for successful setup of the computational system.

In further aspects of the present disclosure, the preconfigured default user profile is exclusively used for creating the plurality of user profiles having the administrator and/or root authorities. Advantageously, by limiting the functionality of the preconfigured default user profile to only creating the plurality of user profiles, aspects of the present disclosure reduce the exploitability of the preconfigured default user profile.

Additional aspects of the present disclosure are directed toward a system comprising one or more processors and one or more computer-readable storage media storing program instructions which, when executed by the one or more processors, are configured to deploy a preconfigured default user profile during booting of the system. The preconfigured default user profile is configured to create a plurality of user profiles having administrator and/or root authorities, where each of the plurality of user profiles is associated with a respective custom password.

Advantageously, the aforementioned aspects of the present disclosure prevent exploitation of default user profiles and default passwords that can be hardcoded into computational systems.

In further aspects of the present disclosure, the preconfigured default user profile enforces password requirements for each of the respective custom passwords. Advantageously, enforcing strong password hygiene improves the security posture of the plurality of user profiles that are created by the preconfigured default user profile.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward role-based access controls (RBAC), and, more specifically, to reducing exploitation of default profiles and default passwords in RBAC systems. While not limited to such applications, embodiments of the present disclosure may be better understood in light of the aforementioned context.

Figure 1A:
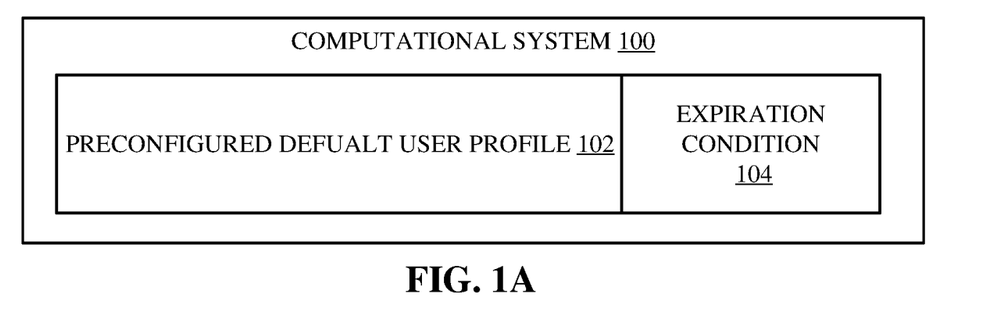
FIG. 1A illustrates a block diagram of an example computational system provided to a customer at a first time with a preconfigured default user profile, in accordance with some embodiments of the present disclosure.

FIG. 1A illustrates a block diagram of an example computational system 100 provided to a customer at a first time with a preconfigured default user profile 102, in accordance with some embodiments of the present disclosure. The preconfigured default user profile 102 can be a profile exclusively configured to create other user profiles (e.g., user profiles with administrative authorities, root authorities, or other authorities) upon setup of computational system 100. For example, preconfigured default user profile 102 can be deployed upon booting, rebooting, imaging, reimaging, configuring, reconfiguring, instantiating, or otherwise setting up a computational system 100.

In contrast to traditional setup mechanisms, the preconfigured default user profile 102 is configured to define other user profiles that will be used to complete setup of the computational system 100. In this way, aspects of the present disclosure remove the attack vector related to exploitation of default user roles and default passwords contained in products initially shipped to a customer. In other words, there is no default administrative role or root role that can be compromised by exploiting a publicly known or otherwise compromised default password. Instead, there is only a preconfigured default user profile 102 that can create new user profiles.

Advantageously, preconfigured default user profile 102 is associated with an expiration condition 104. When the expiration condition 104 is satisfied, the preconfigured default user profile 102 can be automatically deleted. In this way, the preconfigured default user profile 102 is deleted before it can be exploited to create additional user profiles for malicious purposes, thereby improving the security posture of the computational system 100.

The computational system 100 can be any physical or virtual system having processing resources, storage resources, and/or networking resources. The computational system 100 can be, but is not limited to, a laptop, desktop, mainframe, server, storage array, storage controller, networking device, any other computational device, any interconnected network of one or more of the aforementioned computational devices, and/or a virtual instantiation of any of the aforementioned elements.

The preconfigured default user profile 102 and the expiration condition 104 can be downloaded to or otherwise stored on the computational system 100. For example, the preconfigured default user profile 102 and the expiration condition 104 can be loaded onto the computational system 100 as part of fabrication of the computational system 100. In other embodiments, the preconfigured default user profile 102 and the expiration condition 104 can be transmitted to the computational system 100 from a remote data processing device (e.g., via a network, a Universal Serial Bus (USB), a disk, etc.). The preconfigured default user profile 102 and the expiration condition 104 can exist at the operating system (OS) level of the computational system 100, as firmware, as middleware, as software, and so on. In virtual instantiations, the preconfigured default user profile 102 and the expiration condition 104 can exist at the hypervisor level, for example.

While the present disclosure is discussed with respect to the preconfigured default user profile 102 associated with a physical device or a virtual instantiation of a physical device, aspects of the present disclosure are also applicable to software applications, web applications, and/or other applications that may traditionally be delivered to a customer with a default user profile and/or a default password which presents an exploitable security gap. Furthermore, while the present disclosure is primarily discussed with respect to RBAC, aspects of the present disclosure can also be incorporated into other access-control protocols that may traditionally be configured using a default user profile and/or a default password.

Figure 1B:
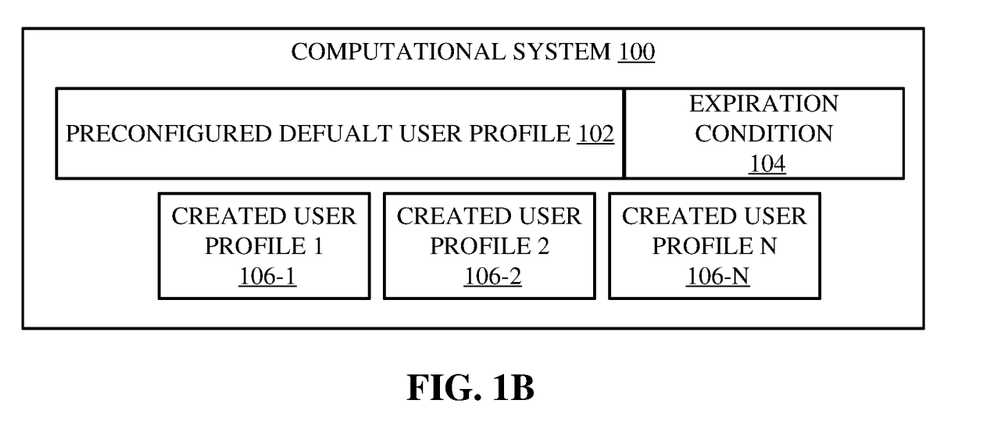
FIG. 1B illustrates a block diagram of an example computational system during booting at a second time after the first time and using a preconfigured default user profile, in accordance with some embodiments of the present disclosure.

FIG. 1B illustrates a block diagram of the example computational system 100 during booting at a second time after the first time and using the preconfigured default user profile 102, in accordance with some embodiments of the present disclosure. As can be seen in FIG. 1B, the preconfigured default user profile 102 is used to create a plurality of created user profiles 106 such as created user profile 1 106-1, created user profile 2 106-2, and created user profile N 106-N. In embodiments, N can refer to any integer. In other words, preconfigured default user profile 102 can be configured to create a single created user profile (e.g., in the case of a smartphone with a single user, for example) or hundreds or thousands of user profiles (e.g., in the case of a datacenter serving a large organization). In some embodiments, the preconfigured default user profile 102 generates the created user profiles 106 upon initial booting of the computational system 100. In other words, generating the created user profiles 106 can be a first step in the setup process when the computational system 100 is delivered to a customer from a vendor.

In some embodiments, each of the created user profiles 106 is associated with a unique or customized password. In this way, none of the created user profiles are associated with a default password, thereby removing the attack vector related to default password exploitation from the computational system 100. Additionally, in some aspects of the present disclosure, the preconfigured default user profile 102 is configured to enforce password rules related to, for example, a length above a threshold, a variety of character types above a threshold, and/or a similarity below a threshold relative to other passwords.

Figure 1C:
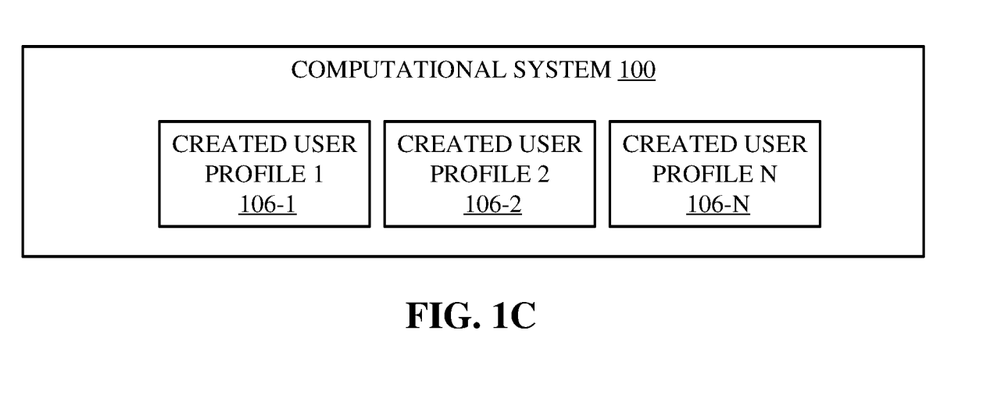
FIG. 1C illustrates a block diagram of an example computational system during setup at a third time after the second time and with the preconfigured default user profile automatically deleted, in accordance with some embodiments of the present disclosure.

FIG. 1C illustrates a block diagram of the example computational system 100 during setup at a third time after the second time and with the preconfigured default user profile 102 automatically deleted, in accordance with some embodiments of the present disclosure. The preconfigured default user profile 102 can be automatically deleted when the expiration condition 104 is satisfied. By automatically deleting the preconfigured default user profile 102, aspects of the present disclosure prevent a malicious actor from using the preconfigured default user profile 102 to maliciously create additional user profiles. Furthermore, automatic deletion avoids user error. For example, users may be instructed to delete a default user profile or change a default password, however, such instructions are inconsistently followed and unenforceable in situations where they are not followed.

The expiration condition 104 can be any number of thresholds, triggers, or conditions useful for strategically triggering deletion of the preconfigured default user profile 102 for security, usability, performance, or other reasons. For example, the expiration condition 104 can be a time-based expiration condition such as, but not limited to, one day, one week, or one month, where the time is measured from the time the computational system 100 is turned on or another time related to the initial boot of the computational system 100. In other embodiments, the expiration condition 104 can be based on the number of created user profiles 106 that are generated. In these embodiments, the expiration condition 104 can cause the preconfigured default user profile 102 to be deleted once a predetermined number (e.g., one, five, ten, twenty, etc.) of created user profiles 106 are generated. In still further embodiments, the expiration condition 104 can be related to a sufficient variety of created user profiles 106. For example, the expiration condition 104 can be triggered to cause automatic deletion of the preconfigured default user profile 102 when each of a plurality of predetermined roles is represented in the created user profiles 106 (e.g., an administrator, a root user, a password administrator, an auditor, etc.).

The aforementioned expiration conditions 104 are non-limiting, and other expiration conditions are possible, such as, but not limited to, expiration conditions 104 based on a status of the computational system 100, expiration conditions 104 inferred from, predicted by, or otherwise defined by machine learning models, manually configured expiration conditions 104, or electronically delivered expiration conditions 104 (e.g., a delete command sent to the computational system 100 upon a first update to the computational system 100).

Furthermore, any of the aforementioned expiration conditions 104 can be combined. For example, a time-based expiration condition 104 can be combined with a rules-based expiration condition 104 such that automatic deletion of the preconfigured default user profile 102 is triggered after a period of time has elapsed since creation of a first created user profile 1 106-1.

Figure 2:
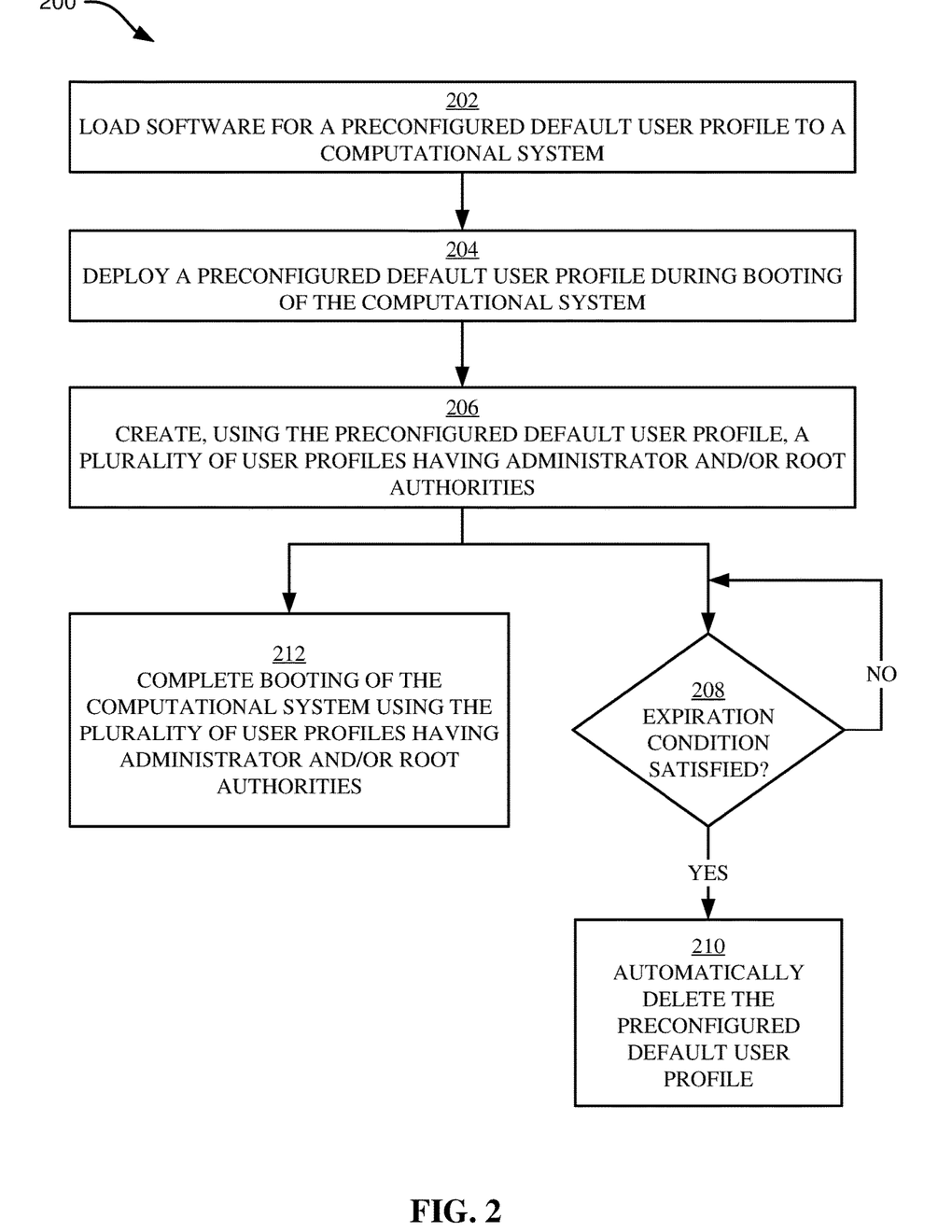
FIG. 2 illustrates a flowchart of an example method for a secure roles-based access control (RBAC) system boot using a preconfigured default user profile, in accordance with some embodiments of the present disclosure.

FIG. 2 illustrates a flowchart of an example method 200 for a secure roles-based access control (RBAC) system boot using a preconfigured default user profile 102, in accordance with some embodiments of the present disclosure. In some embodiments, the method 200 is implemented by a computer, a processor, computational system 100 of FIG. 1, or another configuration of hardware and/or software.

Operation 202 includes loading software for a preconfigured default user profile 102 to a computational system 100. The term software is used here to capture the preconfigured default user profile 102 functioning at any code-based level of implementation in the computational system 100 such as, but not limited to, OS, firmware, software, hypervisor, and the like. Regardless of the code-based level of implementation, operation 202 can include storing program instructions defining the functionality of the preconfigured default user profile 102 and, optionally, the expiration condition 104 in a computer-readable storage medium associated with the computational system 100.

In some embodiments, operation 202 can include downloading the preconfigured default user profile 102 to the computational system 100 as part of the manufacturing process of the computational system 100 or subsequently. In some embodiments, the preconfigured default user profile 102 can be downloaded to the computational system 100 from a remote data processing system. In some embodiments, usage of the preconfigured default user profile 102 can be metered and billed. For example, a number of downloads of the preconfigured default user profile 102 functionality can be tracked, and an invoice based on the number of downloads can be generated. As another example, an amount of data or bandwidth usage associated with implementing, executing, or deploying the preconfigured default user profile 102 functionality can be tracked, and an invoice based on the amount of data or bandwidth usage associated with the preconfigured default user profile 102 functionality can be generated.

Operation 204 includes deploying the preconfigured default user profile 102 during booting of the computational system 100. As previously discussed, operation 204 encompasses any setup associated with the computational system 100 such as, but not limited to, booting, rebooting, imaging, reimaging, configuring, reconfiguring, instantiating, or otherwise setting up the computational system 100. In some embodiments, deploying the preconfigured default user profile 102 involves accessing, by a processor associated with the computational system 100, instructions related to the functionality embodied by the preconfigured default user profile 102, reading the aforementioned instructions, and implementing the aforementioned instructions.

Operation 206 includes creating, using the preconfigured default user profile 102, a plurality of user profiles 106 having administrator and/or root authorities. Administrator and/or root authorities refer to high level, or highest-level, profiles that include authorities sufficient for collectively completing setup of the computational system 100. In other words, as is appreciated by one skilled in the art, various products and brands have unique names for roles which may or may not be explicitly reflected by the terms administrative and/or root authorities. Nonetheless, for the purposes of clarity, administrative and/or root authorities are used herein to generally capture all such high-level authorities regardless of technological platform, purpose, or brand.

In some embodiments, operation 206 includes interacting with a user via a user interface communicatively coupled to the computational system 100 such that the user, while logged in under the preconfigured default user profile 102, can generate the created user profiles 106 and, optionally, their associated passwords. As previously discussed, in some aspects of the present disclosure, the preconfigured default user profile 102 enforces password requirements for each of the respective custom passwords.

After operation 206, the method 200 proceeds to both operation 212 and 208. In some embodiments, operations 212 and 208 occur in parallel (e.g., independently of one another). In other embodiments, operations 212 and 208 occur sequentially (e.g., they depend on one another) such that either operation 208 occurs first, followed by operation 212, or operation 212 occurs first, followed by operation 208. Each of these variations (e.g., in parallel or the two sequential options) have associated advantages and drawbacks. When implemented in parallel, operations 212 and 208 can be independently defined and implemented. In other words, it may be easier to successfully set up a computational system 100 when operations 212 and 208 do not depend on each other. It may also make software updates easier to deploy by keeping the code related to each of operations 212 and 208 separate and independent.

In contrast, when operation 212 occurs prior to operation 208 (e.g., the computational system 100 is set up prior to detecting an expiration condition 104 and automatically deleting the preconfigured default user profile 102), this configuration can reduce the potential for a failed setup. In other words, the computational system 100 is successfully booted before automatically deleting the preconfigured default user profile 102. In the event the booting is not successful, the preconfigured default user profile 102 still exists for a user to create additional user profiles that may be necessary for a successful setup of the computational system 100.

In the final implementation of the three discussed above, when operation 208 is performed before operation 212 (e.g., the expiration condition 104 is satisfied and the preconfigured default user profile 102 deleted prior to completing booting of the computational system 100) it can realize the most secure setup of the computational system 100. In other words, by automatically deleting the preconfigured default user profile 102 prior to completing setup of the computational system 100 using the created user profiles 106, exploitation of the preconfigured default user profile 102 is greatly reduced or removed. One conceivable implementation of this embodiment may cause the preconfigured default user profile 102 to be deleted prior to the computational system 100 connecting to any network (e.g., where network connectivity can be established at a later point in setup of the computational system 100 in operation 212). By deleting the preconfigured default user profile 102 prior to any network connection, it can be less likely that the preconfigured default user profile 102 can be maliciously exploited insofar as a malicious actor would be unable to access the computational system 100 by any network-based attack vector.

Regardless of the order, operation 208 includes determining if an expiration condition 104 is satisfied. As previously discussed, expiration condition 104 can be time-based, rules-based, based on other factors, or based on a combination of the aforementioned factors. If not (208: NO), the method 200 intermittently cycles through operation 208 until the expiration condition 104 is satisfied. For example, the method 200 may intermittently return to operation 208 after each predetermined time interval (e.g., one hour, one day, etc.). As another example, the method 200 can intermittently return to operation 208 after each generation of another created user profile 106. If so (208: YES), the method 200 proceeds to operation 210 and automatically deletes the preconfigured default user profile 102 from the computational system 100.

Regardless of the order, operation 212 includes completing booting of the computational system 100 using the plurality of created user profiles 106. In other words, the preconfigured default user profile 102 is only used to generate the created user profiles 106. The created user profiles 106 are then used to complete the traditional functions related to booting a computational system 100.

Figure 3:
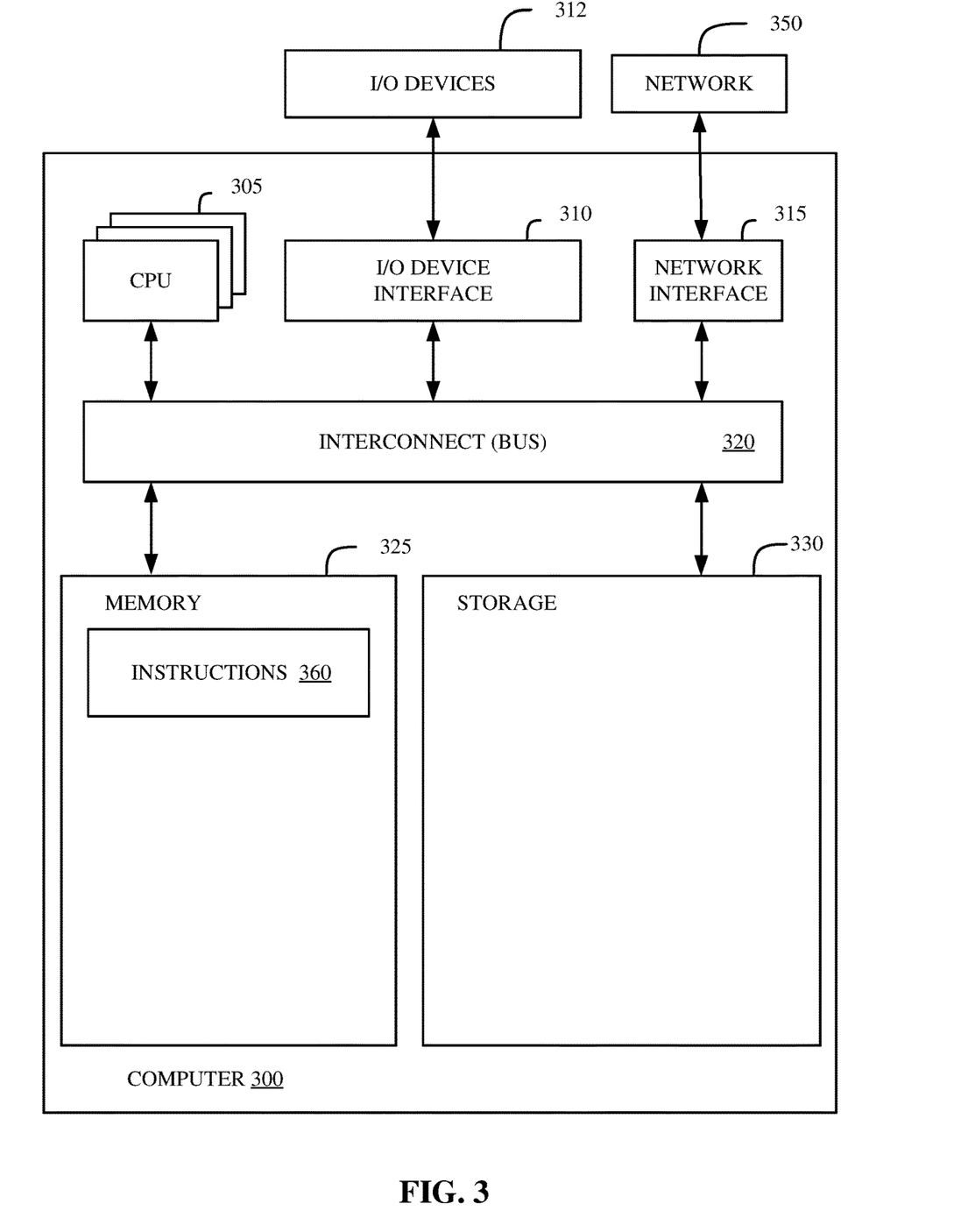
FIG. 3 illustrates a block diagram of an example computer, in accordance with some embodiments of the present disclosure.

FIG. 3 illustrates a block diagram of an example computer 300 in accordance with some embodiments of the present disclosure. In various embodiments, computer 300 can perform any or all portions of the methods described in FIG. 2 and/or implement the functionality discussed in FIG. 1. In some embodiments, computer 300 receives instructions related to the aforementioned methods and functionalities by downloading processor-executable instructions from a remote data processing system via network 350. In other embodiments, computer 300 provides instructions for the aforementioned methods and/or functionalities to a client machine such that the client machine executes the method, or a portion of the method, based on the instructions provided by computer 300. In some embodiments, the computer 300 is incorporated into (or functionality similar to computer 300 is virtually provisioned to) computational system 100 and/or preconfigured default user profile 102 of FIG. 1 and/or other aspects of the present disclosure.

Computer 300 includes memory 325, storage 330, interconnect 320 (e.g., a bus), one or more CPUs 305 (also referred to as processors herein), I/O device interface 310, I/O devices 312, and network interface 315.

Each CPU 305 retrieves and executes programming instructions stored in memory 325 or storage 330. Interconnect 320 is used to move data, such as programming instructions, between the CPUs 305, I/O device interface 310, storage 330, network interface 315, and memory 325. Interconnect 320 can be implemented using one or more buses. CPUs 305 can be a single CPU, multiple CPUs, or a single CPU having multiple processing cores in various embodiments. In some embodiments, CPU 305 can be a digital signal processor (DSP). In some embodiments, CPU 305 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 325 is generally included to be representative of a random-access memory (e.g., static random-access memory (SRAM), dynamic random-access memory (DRAM), or Flash). Storage 330 is generally included to be representative of a non-volatile memory, such as a hard disk drive, solid state device (SSD), removable memory cards, optical storage, or flash memory devices. In an alternative embodiment, storage 330 can be replaced by storage area-network (SAN) devices, the cloud, or other devices connected to computer 300 via I/O device interface 310 or network 350 via network interface 315.

In some embodiments, memory 325 stores instructions 360. However, in various embodiments, instructions 360 are stored partially in memory 325 and partially in storage 330, or they are stored entirely in memory 325 or entirely in storage 330, or they are accessed over network 350 via network interface 315.

Instructions 360 can be computer-readable and computer-executable instructions for performing any portion of, or all of, the method of FIG. 2 and/or implementing the functionality discussed in any portion of FIG. 1. Although instructions 360 are shown in memory 325, instructions 360 can include program instructions collectively stored across numerous computer-readable storage media and executable by one or more CPUs 305.

In various embodiments, I/O devices 312 include an interface capable of presenting information and receiving input. For example, I/O devices 312 can present information to a user interacting with computer 300 and receive input from the user.

Computer 300 is connected to network 350 via network interface 315. Network 350 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
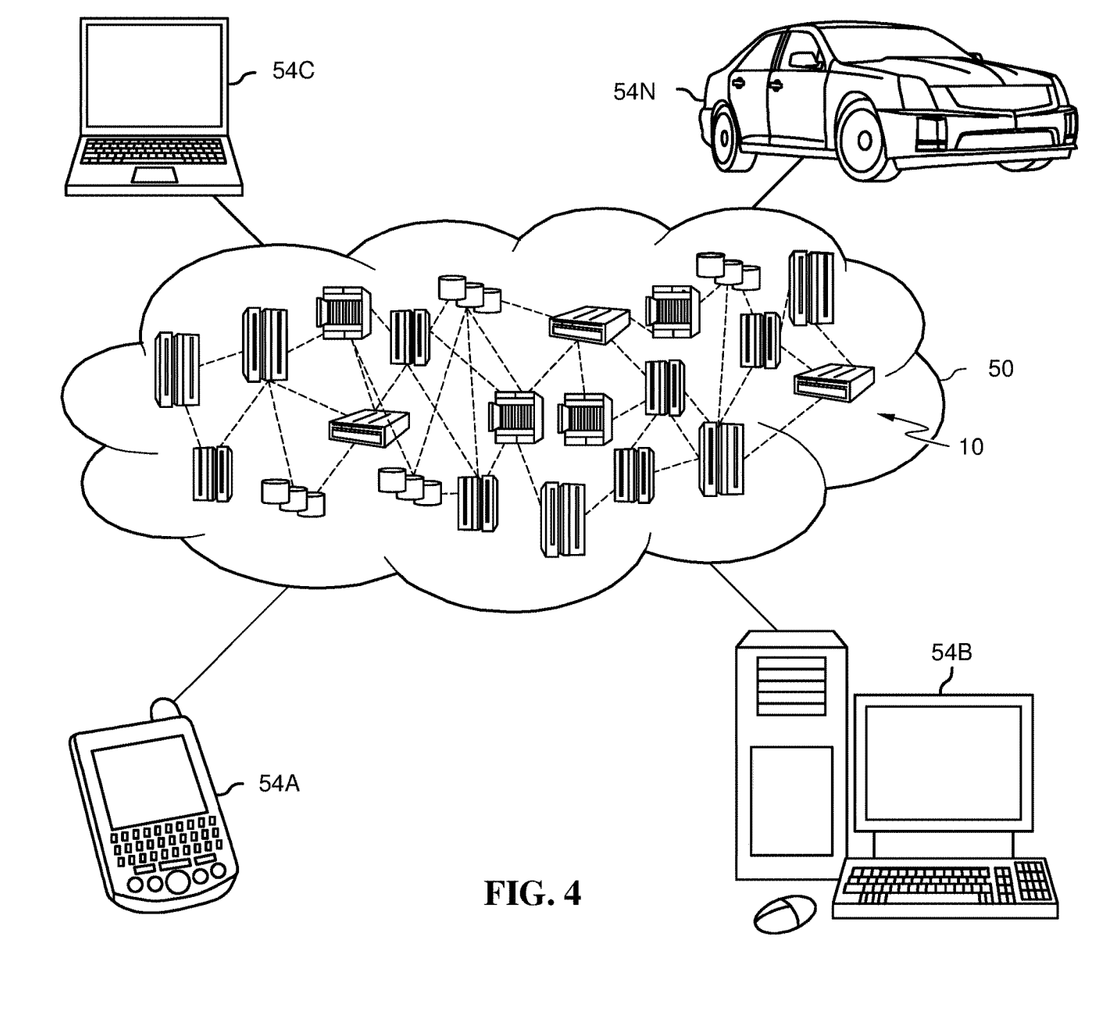
FIG. 4 depicts a cloud computing environment, in accordance with some embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
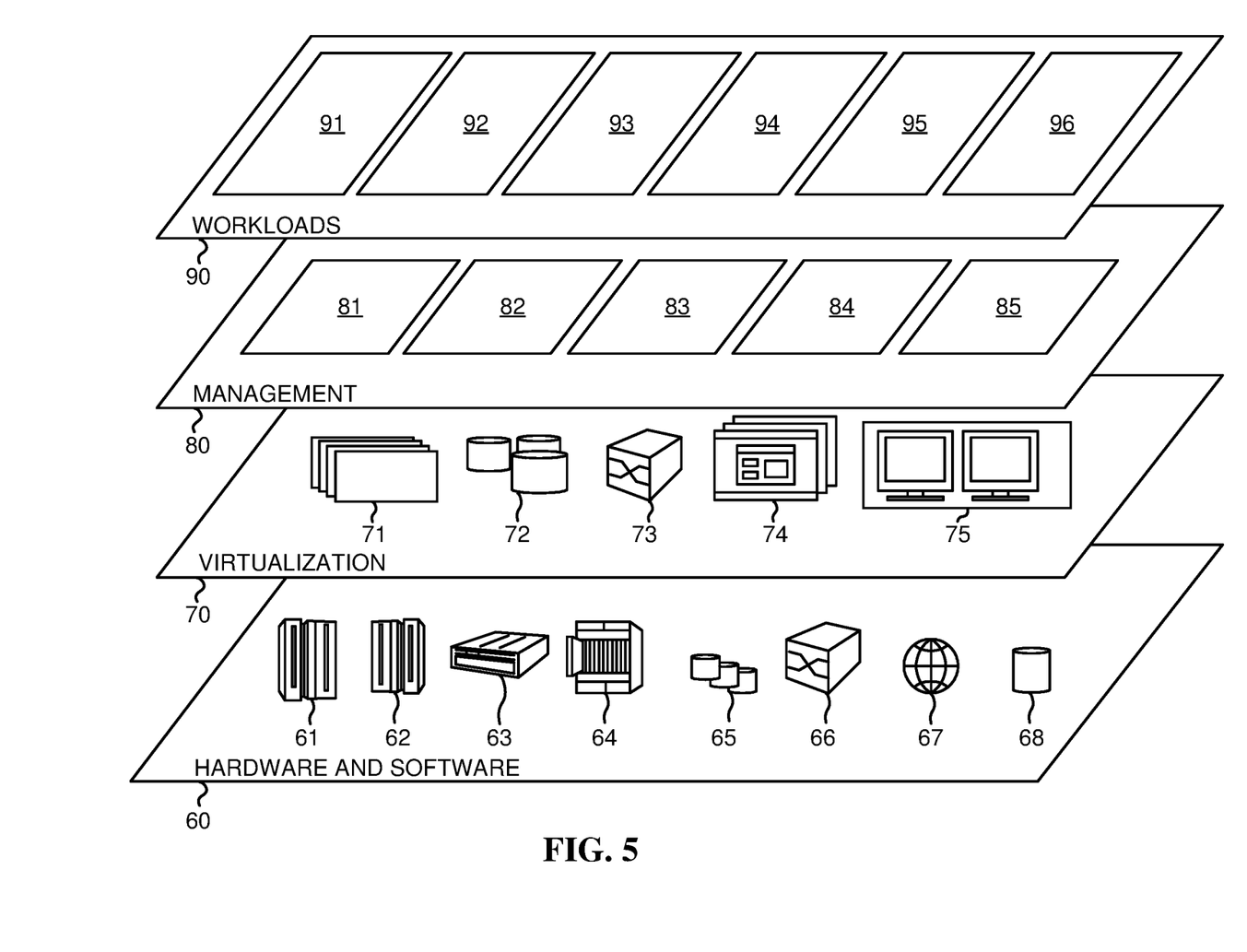
FIG. 5 depicts abstraction model layers, in accordance with some embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides a secure RBAC set during boot of computational system, identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and blockchain transactions 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 360 of FIG. 3 and/or any software configured to perform any portion of the method described with respect to FIG. 2 and/or implement any portion of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes deploying a preconfigured default user profile during booting of a computational system; creating, using the preconfigured default user profile, a plurality of user profiles having administrator and/or root authorities, wherein each of the plurality of user profiles is associated with a respective custom password; and completing booting of the computational system using the plurality of user profiles having the administrator and/or root authorities.

Example 2 includes the method of example 1, including or excluding optional features. In this example, the method includes automatically deleting the preconfigured default user profile after a threshold period of time.

Example 3 includes the method of any one of examples 1 to 2, including or excluding optional features. In this example, the method includes automatically deleting the preconfigured default user profile after creating the plurality of user profiles having the administrator and/or root authorities. Optionally, the plurality of user profiles satisfies a first threshold related to a sufficient number of created user profiles and a second threshold related to sufficient variety of created user profiles.

Example 4 includes the method of any one of examples 1 to 3, including or excluding optional features. In this example, the preconfigured default user profile is exclusively used for creating the plurality of user profiles having the administrator and/or root authorities.

Example 5 includes the method of any one of examples 1 to 4, including or excluding optional features. In this example, the preconfigured default user profile is deleted prior to the plurality of user profiles completing the booting of the computational system.

Example 6 includes the method of any one of examples 1 to 5, including or excluding optional features. In this example, the creating the plurality of user profiles having the administrator and/or root authorities is performed prior to the computational system connecting to a network.

Example 7 includes the method of any one of examples 1 to 6, including or excluding optional features. In this example, the method is performed by the computational system according to software that is downloaded to the computational system from a remote data processing system.

Example 8 includes the method of any one of examples 1 to 7, including or excluding optional features. In this example, the method is performed by the computational system according to software that is uploaded to the computational system from a physically connected computer-readable storage medium. Optionally, the method further comprises: metering a usage of the software; and generating an invoice based on metering the usage.

Example 9 includes the method of any one of examples 1 to 8, including or excluding optional features. In this example the preconfigured default user profile enforces password requirements for each of the respective custom passwords.

Example 10 is a system. The system includes one or more processors; and one or more computer-readable storage media storing program instructions which, when executed by the one or more processors, are configured to deploy a preconfigured default user profile during booting of the system, wherein the preconfigured default user profile is configured to create a plurality of user profiles having administrator and/or root authorities, wherein each of the plurality of user profiles is associated with a respective custom password.

Example 11 includes the system of example 10, including or excluding optional features. In this example, the preconfigured default user profile is configured to automatically expire after a threshold amount of time.

Example 12 includes the system of any one of examples 10 to 11, including or excluding optional features. In this example, the preconfigured default user profile is configured to automatically expire after creating the plurality of user profiles.

Example 13 includes the system of any one of examples 10 to 12, including or excluding optional features. In this example, the preconfigured default user profile has privileges exclusively for creating the plurality of user profiles having the administrator and/or root authorities.

Example 14 includes the system of any one of examples 10 to 13, including or excluding optional features. In this example, the plurality of user profiles having the administrator and/or root authorities are configured to complete the booting of the system. Optionally, the preconfigured default user profile is deleted prior to the plurality of user profiles completing the booting of the system.

Example 15 includes the system of any one of examples 10 to 14, including or excluding optional features. In this example, the preconfigured default user profile is configured to create the plurality of user profiles having the administrator and/or root authorities prior to the system connecting to a network.

Example 16 includes the system of any one of examples 10 to 14, including or excluding optional features. In this example, the preconfigured default user profile enforces password requirements for each of the respective custom passwords.

Example 17 is a system. The system includes one or more processors and one or more computer-readable storage media storing program instructions which, when executed by the one or more processors, are configured to cause the one or more processors to perform a method according to any one of examples 1 to 9.

Example 18 is a computer program product. The computer program product includes one or more computer readable storage media, and program instructions collectively stored on the one or more computer readable storage media, the program instructions comprising instructions configured to cause one or more processors to perform a method according to any one of examples 1 to 9.

What is claimed is:

1. A computer-implemented method comprising:
deploying a preconfigured default user profile during booting of a computational system, wherein the preconfigured default user profile is limited in functionality to exclusively be used for creating a plurality of user profiles having administrator and/or root authorities;

creating, using the preconfigured default user profile, the plurality of user profiles having the administrator and/or root authorities, wherein each of the plurality of user profiles is associated with a respective custom password; and completing booting of the computational system using the plurality of user profiles having the administrator and/or root authorities.

2. The method of claim 1, further comprising:
automatically deleting the preconfigured default user profile after a threshold period of time.

3. The method of claim 1, further comprising:
automatically deleting the preconfigured default user profile after creating the plurality of user profiles having the administrator and/or root authorities.

4. The method of claim 3, wherein the plurality of user profiles satisfies a first threshold related to a sufficient number of created user profiles and a second threshold related to sufficient variety of created user profiles.

5. The method of claim 1, wherein the preconfigured default user profile is deleted prior to the plurality of user profiles completing the booting of the computational system.

6. The method of claim 1, wherein the creating the plurality of user profiles having the administrator and/or root authorities is performed prior to the computational system connecting to a network.

7. The method of claim 1, wherein the preconfigured default user profile enforces password requirements for each of the respective custom passwords.

8. The method of claim 1, wherein the method is performed by the computational system according to software that is downloaded to the computational system from a remote data processing system.

9. The method of claim 1, wherein the method is performed by the computational system according to software that is uploaded to the computational system from a physically connected computer-readable storage medium.

10. The method of claim 9, wherein the method further comprises:
metering a usage of the software; and
generating an invoice based on metering the usage.

11. A system comprising:
one or more processors; and
one or more computer-readable storage media storing program instructions which, when executed by the one or more processors, are configured to deploy a preconfigured default user profile during booting of the system, wherein the preconfigured default user profile is limited in functionality to exclusively be configured to create a plurality of user profiles having administrator and/or root authorities, wherein each of the plurality of user profiles is associated with a respective custom password.

12. The system of claim 11, wherein the preconfigured default user profile is configured to automatically expire after a threshold amount of time.

13. The system of claim 11, wherein the preconfigured default user profile is configured to automatically expire after creating the plurality of user profiles.

14. The system of claim 11, wherein the plurality of user profiles having the administrator and/or root authorities are configured to complete the booting of the system.

15. The system of claim 14, wherein the preconfigured default user profile is deleted prior to the plurality of user profiles completing the booting of the system.

16. The system of claim 11, wherein the preconfigured default user profile is configured to create the plurality of user profiles having the administrator and/or root authorities prior to the system connecting to a network.

17. The system of claim 11, wherein the preconfigured default user profile enforces password requirements for each of the respective custom passwords.

18. A computer program product comprising one or more computer readable storage media, and program instructions collectively stored on the one or more computer readable storage media, the program instructions comprising instructions for implementing a secure roles-based access control (RBAC) setup during boot of a connected computational system, the program instructions executable by the system to perform a method comprising:

deploying a preconfigured default user profile during booting of the computational system, wherein the preconfigured default user profile is limited in functionality to exclusively be used for creating a plurality of user profiles having administrator and/or root authorities;

creating, using the preconfigured default user profile, the plurality of user profiles having the administrator and/or root authorities, wherein each of the plurality of user profiles is associated with a respective custom password; and completing booting of the computational system using the plurality of user profiles having the administrator and/or root authorities.

* * * * *